March 27, 1962 P. B. KELLER 3,026,569
METHOD OF FABRICATING O-RINGS
Filed Feb. 16, 1959 2 Sheets-Sheet 1
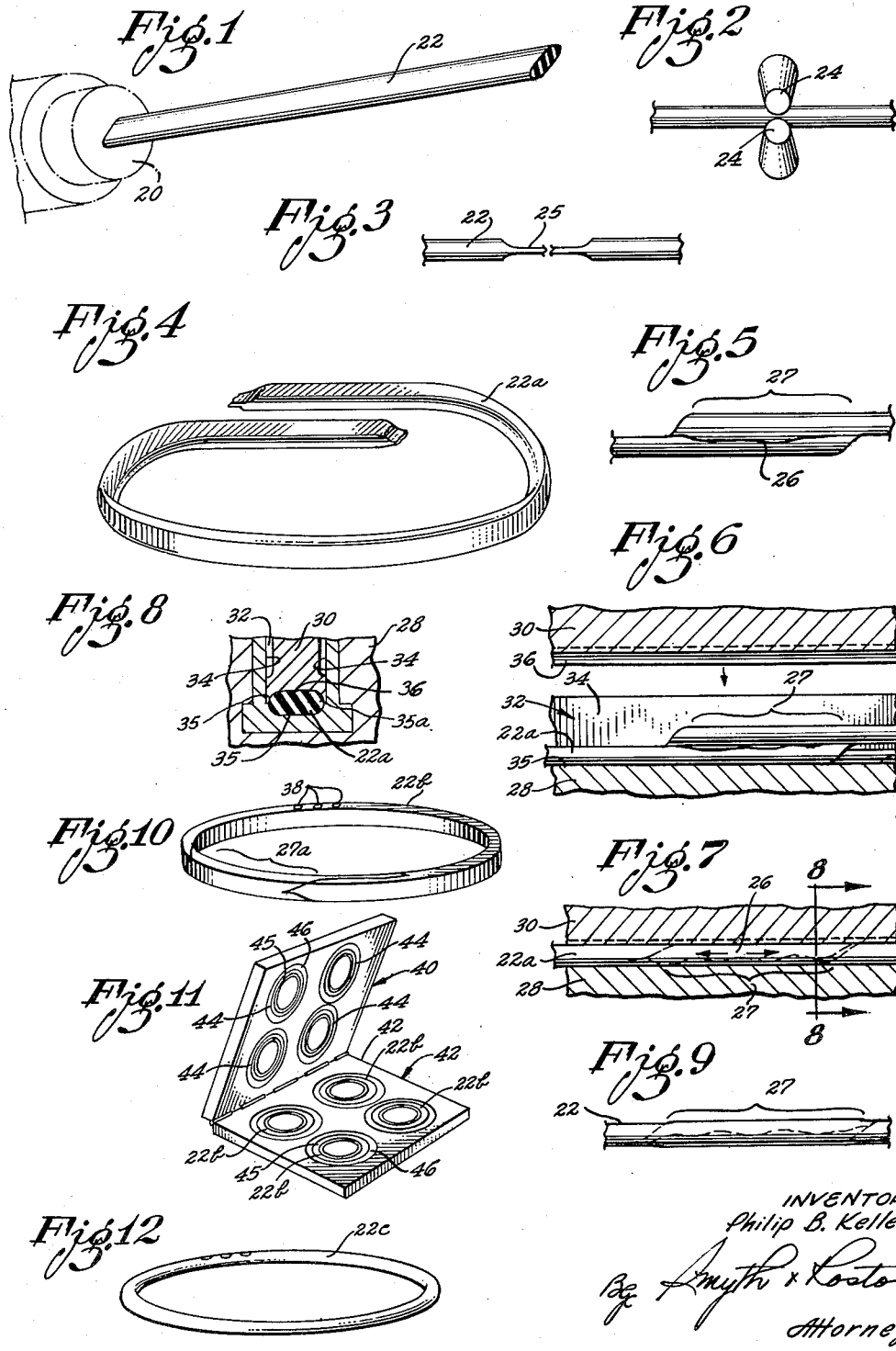
INVENTOR:
Philip B. Keller
By Smyth & Roston
Attorneys March 27, 1962 P. B. KELLER 3,026,569
METHOD OF FABRICATING O-RINGS
Filed Feb. 16, 1959 2 Sheets-Sheet 2
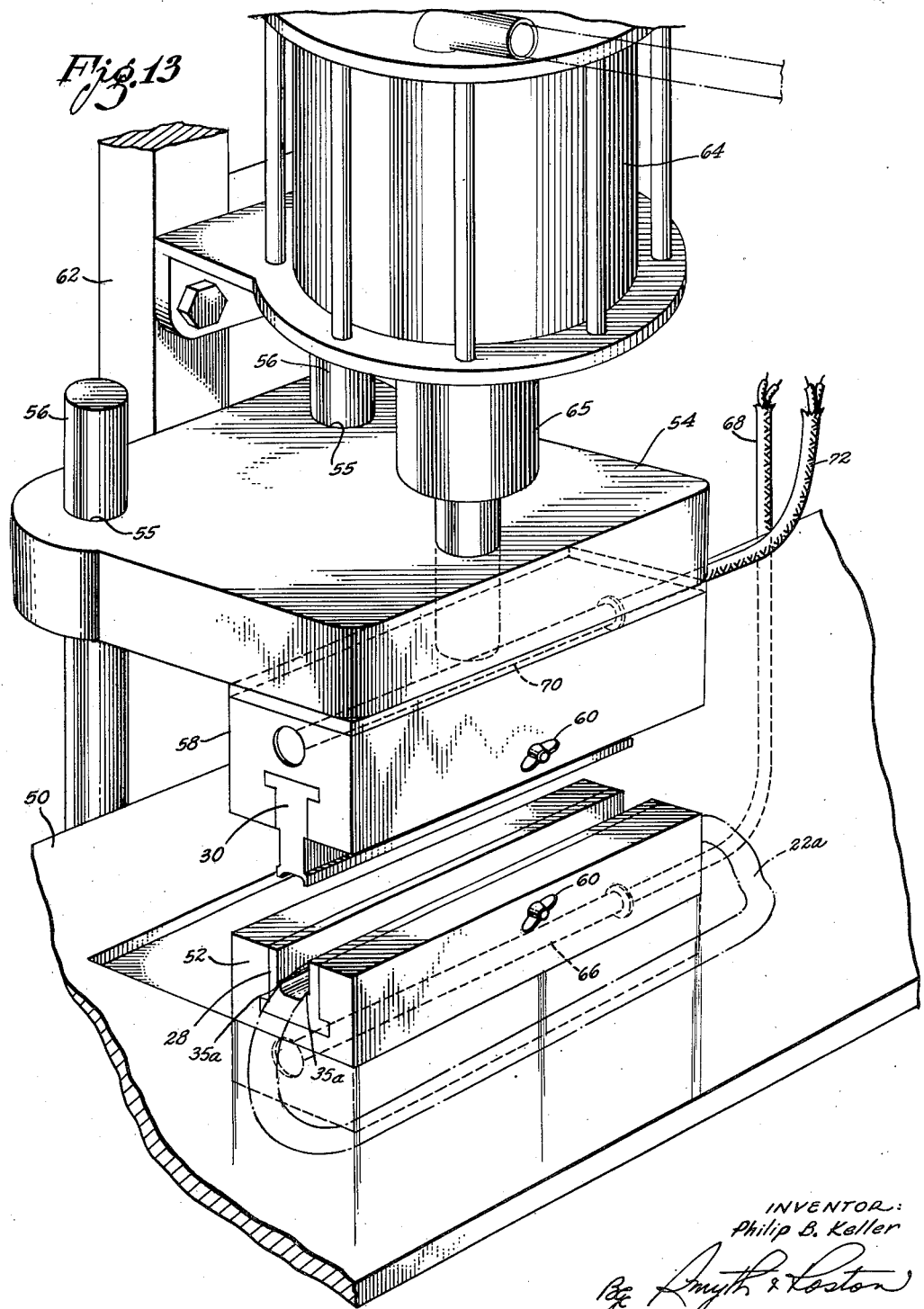
INVENTOR:
Philip B. Keller
Attorneys

United States Patent Office 3,026,569
Patented Mar. 27, 1962

3,026,569
METHOD OF FABRICATING O-RINGS
Philip B. Keller, 245 Tavistock Ave., Los Angeles, Calif.
Filed Feb. 16, 1959, Ser. No. 793,320
5 Claims. (Cl. 18—53)

This invention relates to a method of forming elastomer O-rings.

The conventional method of forming O-rings is to stamp the individual O-rings out of sheets of uncured elastomer stock. This procedure results in the discard of a portion of a sheet that is many times the volume of the O-rings cut from the sheet. The discarded sheet stock is returned to a milling machine to be milled again into sheet material for repeating the operation.

There are a number of disadvantages in this method of fabricating O-rings. One disadvantage is the relatively high milling cost since the milling operation has to be repeated for each sheet of stock out of which the O-rings are punched. Another disadvantage is that it is exceedingly difficult to eliminate bubbles in the molding operation and, of course, any bubbles in an O-ring result in the O-ring being rejected. Another disadvantage is that "crow's-feet" form on the milled sheets and result in blemishes or surface irregularities in the uncured O-rings and often these irregularities survive the subsequent molding and curing of the O-ring. Another disadvantage is that it is often necessary to pile the milled sheets together in preparation for the operation of stamping out the O-rings and often the piled sheets stick together. Consequently blemishes are created when the stacked sheets are pulled apart and these blemishes often survive in the final product.

A very serious disadvantage is that the quality of the elastomer deteriorates each time the material is milled. Because of this deterioration, the quality of the O-rings is not constant, and, moreover, there is a limit to the number of times that the stock can be recycled through the milling operation. When this limit of deterioration is reached, the stock must be thrown away.

A still further disadvantage is that because of the properties of elastomer material, the operation of stamping out the O-rings from the sheet stock necessarily results in a stamped ring that is of tapered cross-sectional configuration. This tapered configuration is not the best configuration for the final molding operation.

The present invention eliminates all of these disadvantages, first, by extruding the uncured elastomer to produce a strip from which O-rings may be fabricated, and, second, by a special method of splicing the ends of such a strip to form a ring. The extrusion operation eliminates bubbles. In the preferred practice of the invention, the extruded stock is of flattened cross section with the flattened portion of substantially uniform thickness instead of tapered thickness. Moreover, the extrusion process produces an uncured O-ring with a smooth surface finish, whereas the operation of punching O-rings out of sheet stock results in uncured O-rings with relatively rough surfaces.

The first step after the extrusion step is to measure off a length of the extruded strip which is much greater than the desired circumference of the ring and to sever the measured length. In practice, the operator may simply pinch the extruded strip on both sides at the desired point for local reduction in the cross section of the extruded strip and then pull the strip apart at the pinched portion. The ends of the uncured severed strip are overlapped by relatively great amounts to result in the desired circumference dimension and are then pressed together by finger pressure for temporary mutual adherence to form what may be termed a starting ring.

The extensive overlapping of the strip ends with consequent doubling of the cross-sectional area in the overlapping region of the starting ring is of primary importance because the success of the subsequent splicing operation depends upon the specific effects of using a die to trap and compress the elastomer to reduce the cross section of the starting ring in this region. The die used for this splicing operation differs from a conventional molding die in preventing escape of the elastomer from the forming cavity during the step of closing the die instead of permitting excess material to flow freely out of the forming cavity laterally thereof. Since the splicing die traps the elastomer of the enlarged overlapped region of the starting ring and permits flow displacement only in the two opposite circumferential directions from that region, a high pressure peak is created in the overlap region. The overlapping portions are forced into high pressure mutual contact along the interface of the overlapping portions with simultaneous displacement of the elastomer in opposite directions and corresponding elongation of the interface. The result is highly effective fusion of the overlapping portions of the starting ring along the whole interface.

The major portion of the circumferential displacement of the material in opposite directions from the overlap region caused by closing of the splicing die is permanent flow of the elastomer but inevitably an appreciable remaining portion of the displacement is temporary elastic displacement occurring within the elastic limits of the elastomer. Consequently, with the release of the material in the overlap region by the opening of the splicing die, the cross-sectional configuration of the ring springs back to a somewhat larger cross-sectional configuration than the cross-sectional configuration of the cavity of the splicing die. The resulting cross section is much less than the starting cross section of the overlap region by virtue of the permanent flow displacement of the elastomer.

It is apparent that since the splicing die causes displacement in opposite circumferential directions and permanent reduction of cross section in the overlap region, the splicing operation increases the circumference of the starting ring. In compensation for this increase in circumference, the initial circumference of the starting ring is made correspondingly smaller than the desired final circumference of the spliced ring.

It is further apparent that even after the splicing operation, the cross section in the overlap region is larger than the desired cross section of the final O-ring. This further fact offers no difficulty, however, because the final die for molding and curing the O-ring freely permits escape of the excess material laterally of the die cavity.

Theoretically, it would be possible to use about the same volume of elastomer for the starting ring as desired in the final O-ring and to "over-form" the overlap region of the starting ring in the splicing die, i.e., dimension the splicing die to compress the resilient elastomer to less than the desired cross section of the O-ring so that the release of the ring from the splicing die causes the overlap region of the ring to expand resiliently or spring back to the desired final cross section. There are so many variables involved, however, that this approach is not feasible and "over-forming" should be carefully avoided under penalty of producing an excessive number of rejects. The use of the splicing die of the invention reliably avoids any possibility of "over-forming."

Preferably heat is applied during the splicing operation, but the temperature used and the duration of the heating step are much less than required for actually curing the elastomer. The use of heat facilitates the permanent displacement that occurs when the splicing die is closed, as distinguished from the temporary resilient displacement, and has been found to be helpful for fusion along the overlap interface when an elastomer is of very poor knitting quality. It is to be understood, however, that the heating step may be omitted.

After the splicing operation, the uncured ring is placed in a mold that has concentric overflow cavities adjacent the molding cavity into which excess material is displaced when the mold is closed. Preferably the volume of the uncured spliced ring is approximately 25% greater than the volume of the finished O-ring to make sure that the curing mold is completely filled with no bubbles present, the 25% excess being displaced into the overflow cavities. In the preferred practice of the invention, the spliced uncured O-ring is flattened in radial dimension and correspondingly elongated in axial dimension, and this configuration is further conducive to completely filling the split curing mold without the presence of any voids whatsoever.

The various features and advantages of the invention may be understood by reference to the following detailed description together with the accompanying drawings.

In the drawings, which are to be regarded as merely illustrative:

FIG. 1 is a fragmentary perspective view of an extruded strip of the uncured elastomer material that may be used for the O-rings;

FIG. 2 is a side elevation of a portion of the extruded strip showing how a pinching tool may be utilized to pinch a portion of the extruded strip for reduction in the cross section thereof;

FIG. 3 is a fragmentary side elevation showing how the extruded strip may be pulled apart for severance at the pinched portion;

FIG. 4 is a perspective view showing how the opposite ends of the strip are positioned in overlapping relationship;

FIG. 5 is a fragmentary side elevation showing the overlapping ends of FIG. 4 pressed together into mutual adherence;

FIG. 6 is a fragmentary sectional view of the splicing die showing the die open with a joint portion of an uncured ring positioned therein in preparation for the splicing and knitting operation;

FIG 7. is a view similar to FIG. 6 with the die closed to carry out the splicing and knitting operation;

FIG. 8 is a transverse section of the closed splicing die taken as indicated by the line 8—8 of FIG. 7;

FIG. 9 is a fragmentary side elevation of the uncured ring after the splicing and knitting operation showing how the ring is thickened in the splice region;

FIG. 10 is a perspective view of the spliced and knitted uncured O-ring ready for the final molding and curing operation;

FIG. 11 is a perspective view on a reduced scale of a molding die for carrying out the final operation;

FIG. 12 is a perspective view of the finished O-ring; and

FIG. 13 is a perspective view of an apparatus incorporating a splicing die that may be used for the splicing and knitting operation.

FIG. 1 shows how uncured elastomer may be extruded from an extrusion die 20 of a well-known type to produce a continuous strip 22 of the uncured stock. Preferably, but not necessarily, the strip 22 is of flattened cross-sectional configuration with rounded edges, the strip being of constant thickness over the major portion of its width.

For the purpose of fabricating an uncured ring, an appropriate length of the strip 22 is measured off and severed. This length is determined by both the amount of overlap desired and the initial circumference of the ring. As heretofore stated, this initial circumference of the starting ring is made smaller than the desired final circumference to compensate for the increase in circumference by the splicing operation.

While the measured length may be severed in any suitable manner, for example by a cutting or slicing operation, it has been found advantageous simply to pinch the strip 22 and then to pull the pinched portion apart. FIG 2 shows how a pinching tool in the form of pliers with a pair of rounded jaws 24 may be used for the pinching operation. If desired, the operator may simply pinch the uncured strip in the same manner by finger pressure. The operator then grasps the strip 22 on opposite sides of the pinched portion and pulls the strip apart. FIG. 3 shows how the pinched portion 25 breaks into two parts.

The next step is to curve the measured severed strip 22a to the desired diameter and circumference in the manner shown in FIG. 4. It is contemplated that the ends of the strip will be overlapped and spliced together to form a band or starting ring in which the radial cross-sectional dimension of the ring is the maximum cross-sectional dimension. In other words, it is contemplated that the strip material forming the spliced ring will fit edgewise into the open mold in the subsequent molding and curing operation. It may be seen in FIG. 4 that the major portion of the curved strip is upright, i.e., the maximum cross-sectional dimension of the strip is vertical but that the two end portions of the ring are twisted to horizontal positions for splicing. It is apparent that if the uppermost overlapping end is positioned flatwise on the lowermost end portion and bonded thereto, the bonded portions may be subsequently twisted back to the same upright configuration as the remaining portion of the strip.

In preparation for the splicing and knitting step, the operator simply presses the upper overhanging end portion of the curved strip shown in FIG. 4 against the underlying lower end portion to cause the two edge portions to adhere to each other temporarily along an interface 26, as shown in FIG. 5. The interface 26 may be of somewhat wavy configuration because of the manipulation of the material by the operator. It is apparent that this operation produces what may be termed a joint zone or splice zone indicated by the bracket 27 in which the uncured elastomer is of twice the thickness of the rest of the formed ring.

The next step is to place the splice zone 27 of the formed ring in a splicing die means of the cross-sectional configuration shown in FIGS. 6 and 8. The die means comprises a lower female die 28 and an upper male die 30 that is adapted to telescope retractably into the female die to trap and compress the elastomer. The female die 28 forms a groove 32 that is open at both ends, the groove being long enough to accommodate the spliced portion 27 of the unformed ring but short enough to permit the major portion of the ring to lie outside the die means during the splicing operation. The groove 32 has parallel side walls 34 and a curved bottom wall 35 conforming substantially to the contour of the strip 22.

As shown in FIG. 8, the groove 32 receives the strip material of the formed ring flatwise and conforms to the cross-sectional configuration of the strip material. The male die 30 is dimensioned to slide between the side walls of the groove 34 with a close fit to prevent escape or extrusion of the elastomer around the edges of the male die. The male die has a leading face 36 which also conforms to the configuration of the flat side of the strip material. As clearly shown in FIG. 8, the female die 28 includes a pair of shoulders longitudinally arranged on opposite sides of the curved bottom wall 35. It can be seen from FIG. 8 that the shoulders 35a form means for positively limiting movement of the male die 30 into the female die to so space the leading face 36 of the male die a predetermined distance from the bottom wall 35 as to form therebetween a molding cavity having a cross-sectional size and shape conforming to the cross-sectional size and shape of a single strip of the elastomer; that is, when the two dies 28 and 30 close together, they contract the cross section of the trapped elastomer to substantially the cross section of the original strip 22.

It is apparent that when the two dies 30 and 28 are closed together to restrict the material confined therein to substantially the cross-sectional configuration of the original strip 22, the overlapping ring material in the splice zone 27 is displaced circumferentially of the ring in opposite directions from the center of the splice zone, as indicated by the oppositely directed arrows in FIG. 9, with consequent elongation or increase in the circumferential dimension of the ring. Apparently this displacement or forced flow of the material in the splice zone 27 caused by the closing of the splicing die results in some degree of sliding action on the part of the material of the overlapping ends along the interface 26 of the splice zone.

As heretofore indicated, the splicing die means comprising the two dies 28 and 30 is preferably heated to a moderately low temperature, say on the order of 170° F. and the material is kept under confinement by the closed dies for a relatively short period, for example for a period of twenty-five seconds. The selected temperature and the duration of the operation are not sufficient to cause any appreciable curing of the material in the splice zone. As heretofore pointed out, the application of heat increases the permanent flow displacement of the confined elastomer and correspondingly decreases the temporary resilient displacement to reduce the degree that the elastomer springs back to a larger cross section in the splice zone when the material is released from the splicing die.

The result of the described splicing operation is to produce an uncured spliced ring 22b which is effectively knitted in the splice zone and which is slightly enlarged in the splice zone as shown in FIGS. 9 and 10. At this stage, the uncured knitted ring may be marked with three dots 38 of colored ink to designate the material and dimensions of the O-ring in accord with a well-known code.

The final step is to mold and cure the spliced ring 22b. FIG. 11 shows a mold for this purpose that processes four O-rings at a time. The mold comprises two halves 40 and 42 which are hinged together to close with accurate relative positioning of the two halves. FIG. 11 shows four of the spliced rings 22b positioned in the lower half mold 42. The upper half mold has corresponding circular molding grooves 44. In a well-known manner, each of the two mold halves 40 and 42 has a groove 45 inside and immediately adjacent to the circular molding groove to receive excess material that is extruded or squeezed out of the molding grooves when the two die halves are pressed together, the greatest extrusion occurring in the enlarged splice region. For the same purpose, the two die halves 40 and 42 have concentric grooves 46 outside the forming grooves and immediately adjacent thereto.

The molding operation with the mold shown in FIG. 11 is carried out in the conventional manner with sufficient heat to caused complete curing of the elastomer. The result is the conversion of the spliced uncured rings 22b, such as shown in FIG. 10, into finished O-rings such as the O-ring 22c shown in FIG. 12. The cured O-ring 22c is of uniform cross section throughout its circumference with no evidence of where the material is spliced.

It may be readily appreciated that since the O-ring 22c is produced from an extruded strip, only ordinary care is required to avoid the presence of any bubbles whatsoever. It may also be readily appreciated that the described process eliminates wastage and that the material of the finished O-rings is of top quality because it has not been deteriorated by repeated milling.

FIG. 13 shows by way of example an apparatus for incorporating the splicing dies 28 and 30 to carry out the splicing operation. FIG. 13 shows a stationary platen 50 on which is fixedly mounted a die block 52 incorporating the female die 28. An upper reciprocative support block 54 having vertical bores 55 for guidance by upright rods 56 carries an upper die block 58 that incorporates the male die 30. The two dies 28 and 30 may be releasably retained in the corresponding die blocks 52 and 58 by conveniently accessible thumb screws 60.

Mounted on an upright support 62 is an overhead power cylinder 64 which may be actuated under remote control by compressed air. Extending downward from the power cylinder 64 in a well-known manner is a piston rod 65 which is fixedly connected to the block 54 for reciprocation of the male die 30 relative to the female die 28.

FIG. 13 shows a formed uncured ring 22a positioned in the female die 28 in the manner heretofore described in preparation for the splicing operation. To supply the required heat during the splicing operation, a heating element 66 may be imbedded in the lower die block 52 to heat the female die 28, the heating element 66 being energized by wires in a cable 68. In like manner, a heating element 70 may be imbedded in the upper die block 58 and energized by wires in a cable 72 to heat the male die 30. Both of these heating elements may be automatically controlled by thermostat elements (not shown) in a well-known manner.

My description in specific detail of the presently preferred practice of the invention will suggest various changes, substitutions and other departures from my disclosure within the spirit and scope of the appended claims.

I claim:

1. A method of fabricating an elastomer O-ring, characterized by the steps of: extruding uncured elastomer stock to form a strip having at least the desired final cross-sectional area of the O-ring; severing a length of said strip; forming said strip into a ring of less than the desired circumference of the O-ring with the ends of the strip overlapping in mutual contact to form a splice zone of substantially double the cross section of the rest of the ring; confining the enlarged joint zone of the ring in an enlongated spicing chamber of larger cross section than the desired final cross section with the chamber wall extending completely around the cross-sectional configuration of the ring and contracting the cross section of the chamber to substantially less than said double cross section to place the overlapping material in the splice zone under pressure and to cause elongation of the elastomer longitudinally of the chamber and circumferentially of the ring by both permanent flow and elastic deformation of the confined elastomer; releasing the ring from the splicing chamber with release of the elastic deformation for recovery of cross section in the splice zone to greater than the desired final cross section of the O-ring with the circumference of the ring increased from the starting circumference to approximately the desired final circumference of the ring; then curing the spliced ring in a mold of the desired final configuration with removal of the excess elastomer from the ring in said splice zone by the mold.

2. A method as set forth in claim 1 which includes the step of applying heat to the elastomer confined in said splicing chamber to increase the permanent flow and decrease the resilient displacement of the elastomer, the degree of heat and the duration of the heating step being insufficient to cure the elastomer.

3. A method of fabricating an elastomer O-ring characterized by the steps of: extruding uncured elastomer stock to form a strip having at least the desired final cross-sectional area of the O-ring; severing a length of said strip by first pinching the strip to flatten its cross section and then pulling the strip apart at the flattened cross section to produce a severed strip having flattened ends; forming said strip into a ring of less than the desired circumference of the O-ring with the ends of the strip overlapping in mutual contact to form a splice zone of substantially double the cross section of the rest of the ring; confining the enlarged joint zone of the ring in an elongated splicing chamber of larger cross section than the desired final cross section with the chamber wall extending completely around the cross-sectional configuration of the ring and contracting the cross section of the chamber to substantially less than said double cross section to place the overlapping material in the splice zone under pressure and to cause elongation of the elastomer longitudinally of the chamber and circumferentially of the ring by both permanent flow and elastic deformation of the confined elastomer; releasing the ring from the splicing chamber with release of the elastic deformation for recovery of cross section in the splice zone to greater than the desired final cross section with the circumference of the ring increased from the starting circumference to approximately the desired final circumference of the ring; then curing the spliced ring in a mold of the desired final configuration with removal of the excess elastomer from the ring in said splice zone by the mold.

4. A method of fabricating an elastomer O-ring, characterized by the steps of: extruding uncured elastomer stock to form a flattened strip of at least the desired cross-sectional area of the O-ring; severing a length of said strip; forming said strip into a ring of less than the desired circumference of the O-ring with the ends of the strip overlapping in mutual face to face contact to form a splice zone of substantially double the cross section of the rest of the ring; placing the splice zone of the ring flatwise in a trough having a bottom approximating the configuration of the flat side of the strip and having substantially parallel side walls; moving an elongated forming member of the same width as the trough into the trough with the leading face of the forming member conforming to the flat configuration of the strip and maintained parallel with the bottom of the trough to compress the splice zone of the ring to substantially less than said double cross section to place the overlapping material in the splice zone under pressure and to cause elongation of the elastomer longitudinally of the chamber and circumferentially of the ring by both permanent flow and elastic deformation of the confined elastomer; releasing the ring from said trough with release of the elastic deformation for recovery of cross section in the splice zone to greater than the desired final cross section with the circumference of the ring increased from the starting circumference to approximately the desired final circumference of the ring; then curing the spliced ring in a mold of the desired final configuration with removal of the excess elastomer from the ring in said splice zone by the mold.

5. A method as set forth in claim 4 which includes the step of applying heat to the elastomer confined in said trough to increase the permanent flow and decrease the resilient displacement of the elastomer, the degree of heat and the duration of the heating step being insufficient to cure the elastomer.

References Cited in the file of this patent
UNITED STATES PATENTS

| | | |
|---|---|---|
| 2,338,524 | McCabe | Jan. 4, 1944 |
| 2,514,197 | Groten et al. | July 4, 1950 |
| 2,688,996 | Loomis | Sept. 14, 1954 |
| 2,765,837 | Kenyon | Oct. 9, 1956 |